(No Model.)  
7 Sheets—Sheet 1.

G. W. BAILEY.
CASH REGISTER AND INDICATOR.

No. 515,418.  
Patented Feb. 27, 1894.

Fig. 1.

Witnesses:—  
D. H. Hayford  
Fred F. Kemper

Inventor  
George W. Bailey  
By his Attorneys  
Gifford & Law (No Model.)  G. W. BAILEY.  7 Sheets—Sheet 2.
CASH REGISTER AND INDICATOR.

No. 515,418.  Patented Feb. 27, 1894.

Fig. 2.

(No Model.) 7 Sheets—Sheet 3.

G. W. BAILEY.
CASH REGISTER AND INDICATOR.

No. 515,418. Patented Feb. 27, 1894.

Witnesses:—
H. F. Nayport
Fred. F. Kemper

Inventor
George W. Bailey
By his Attorneys
Gifford & Saw (No Model.) 7 Sheets—Sheet 4.

G. W. BAILEY.
CASH REGISTER AND INDICATOR.

No. 515,418. Patented Feb. 27, 1894.

Witnesses:

Inventor
George W. Bailey
By his Attorneys
Gifford & Law

(No Model.)

G. W. BAILEY.
CASH REGISTER AND INDICATOR.

Patented Feb. 27, 1894.

(No Model.) 7 Sheets—Sheet 6.

G. W. BAILEY.
CASH REGISTER AND INDICATOR.

No. 515,418. Patented Feb. 27, 1894.

Witnesses:—
D. H. Hayward
Fred Kempfer

Inventor
George W. Bailey
By his Attorneys
Gifford & Law

(No Model.)

G. W. BAILEY.
CASH REGISTER AND INDICATOR.

Patented Feb. 27, 1894.

Witnesses:—

Inventor
George W. Bailey
By his Attorneys

UNITED STATES PATENT OFFICE.

GEORGE W. BAILEY, OF BROOKLYN, NEW YORK.

CASH REGISTER AND INDICATOR.

SPECIFICATION forming part of Letters Patent No. 515,418, dated February 27, 1894.

Application filed March 15, 1893. Serial No. 466,079. (No model.)

*To all whom it may concern:*

Be it known that I, GEORGE W. BAILEY, of Brooklyn, in the county of Kings and State of New York, have invented a new and useful Improvement Applicable to Cash-Registers or Adding-Machines, of which the following is a specification.

My machine may, for the purposes of description, be divided into two parts: the adding and registering mechanism by which the sum of the several amounts displayed by the indicator mechanism is computed and registered; and the indicator mechanism by which the operator indicates each amount registered. I believe that both of these mechanisms as well as their combination are new.

In using my machine in its preferred form the operator will make three motions. First. A motion from zero to the number to be registered. Second. A motion to indicate or disclose the number registered. Third. A motion the reverse of the last. Fourth. A motion back to zero. During each of said motions the parts will be governed by the following conditions: $a$. During the first motion the adding and registering mechanism will be moved forward but is locked or cut off from backward movement. $b$. At the end of the second motion the adding and registering mechanism and the indicator mechanism, one or both is locked or cut off from either forward or backward motion. $c$. At the end of the third motion the adding and registering mechanism remain locked or cut off from backward motion but the indicator mechanism is made or left free to move backward. $d$. At the end of the fourth motion all parts are placed in condition for a repetition of their described motions.

The first form of the apparatus I am about to describe is illustrated in Figures 1 to 6 inclusive; the second form, in Figs. 7 to 14 inclusive, of the accompanying drawings.

Figs. 3*, 4 and 5 are details. Figs. 9 and 10 show the mechanism attached to the rear of the plate $k$ which is omitted from Fig. 11 that is otherwise a central vertical section. Figs. 12, 13 and 14 are details.

Figure 1:
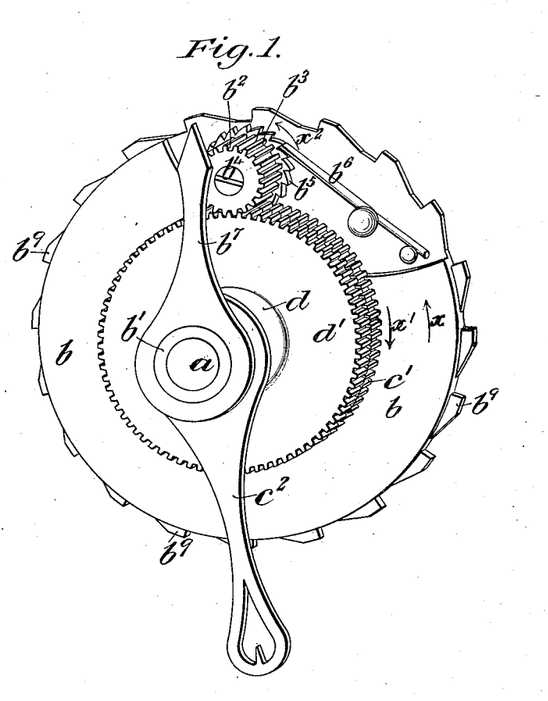
Fig. 1 is a detached portion to show clearly the preferred mode of operation of the adding and registering mechanism.

The general principle embodied in the adding and registering mechanism is so far alike in both forms that it may be conveniently described by reference to Fig. 1.

$a$ is a central shaft.

$b'$ is a sleeve integral with the disk $b$ which revolves in the direction of the arrow $x$.

Figure 3:
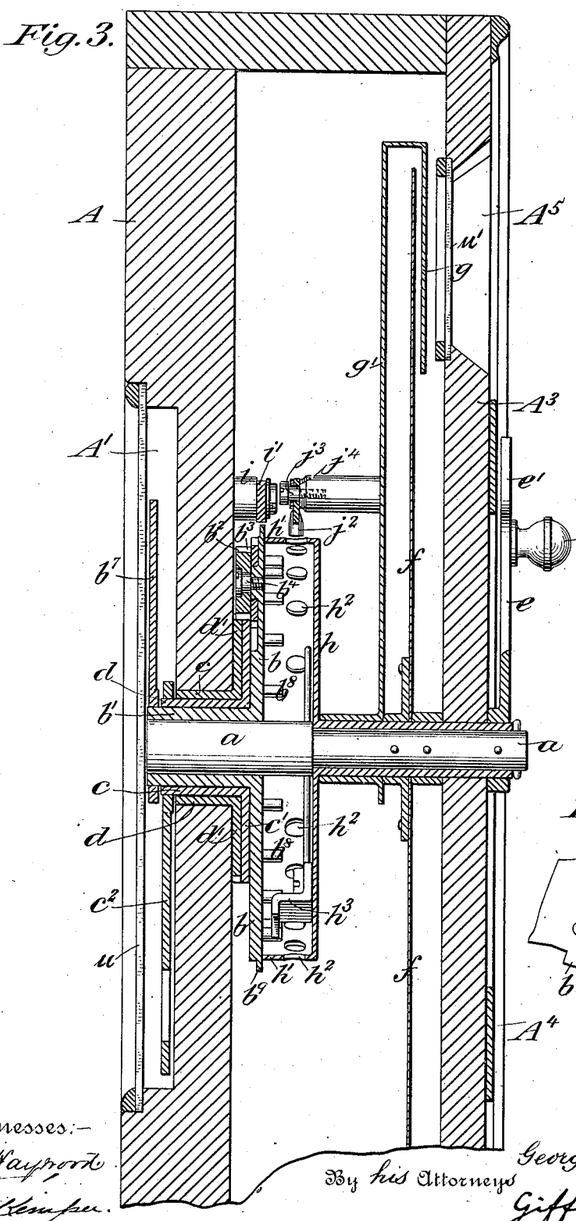
Fig. 3 is a central vertical section.

$c$ shown in Fig. 3, is a sleeve integral with the gear wheel $c'$ which revolves in the direction of the arrow $x'$.

$d$ is a sleeve integral with the gear wheel $d'$ which is held stationary by any suitable means.

$b^2$, $b^3$ is a gear wheel free to revolve in the direction of the arrow $x^2$ upon a stud $b^4$ fixed in the face of the disk $b$.

$b^5$ is a ratchet fixed to one end of the gear $b^2$, $b^3$ which is prevented from revolving in the opposite direction to the arrow $x^2$ by the spring pawl $b^6$ fixed upon the disk $b$.

$b^7$ is a pointer fixed upon the sleeve $b'$.

$c^2$ is a pointer fixed upon the sleeve $c$.

As the disk $b$ is revolved in the direction of the arrow $x$, it carries the gear $b^2$ (which meshes with the gear $d'$) and $b^3$ (which meshes with the gear $c'$) with it and at the same time the fact that the gear $d'$ is fixed, causes the gear $b^2$, $b^3$ to revolve upon its own axis in the direction of the arrow $x^2$. Thus, the gear $b^2$, $b^3$ receives an orbital or planetary motion. If, now, the number of teeth in $d'$ equals the number of teeth in $c'$ and also the number of teeth in $b^2$ equals the number of teeth in $b^3$, the gear $c'$ will remain stationary. If, however, this equality is departed from the gear $c'$ will be caused to revolve either in the direction of the arrow $x'$ or in the opposite direction depending upon which of the gears contains the greater number of teeth. In the construction shown, the teeth in $b^2$ and $b^3$ are equal; but while there are one hundred teeth in $d'$ there are one hundred and one teeth in $c'$, the effect of which is that for every revolution of the disk $b$ and the pointer $b^7$ in the direction of the arrow $x$, the gear $c'$ and pointer $c^2$ will move one tooth in the direction of the arrow $x'$. Furthermore, if the disk $b$ is moved five teeth on the gear $d'$ for every five cents displayed by the indicator mechanism hereinafter described, its complete revolution will correspond with one dollar upon the indicator mechanism and this amount may be shown by the movement of the pointer $c^2$ one tooth or one count on a dial suitably arranged to register its movement.

Figure 6:
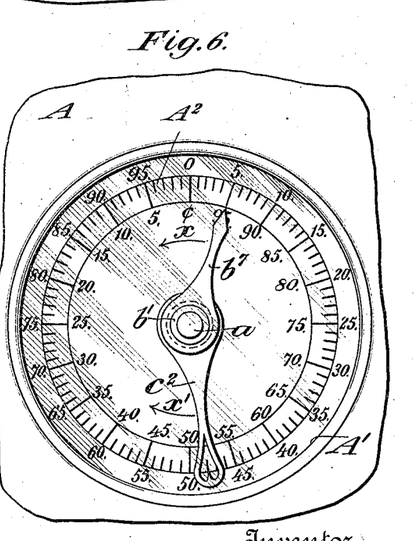
Fig. 6 shows the registering dial inclosed in glass.
Figure 7:
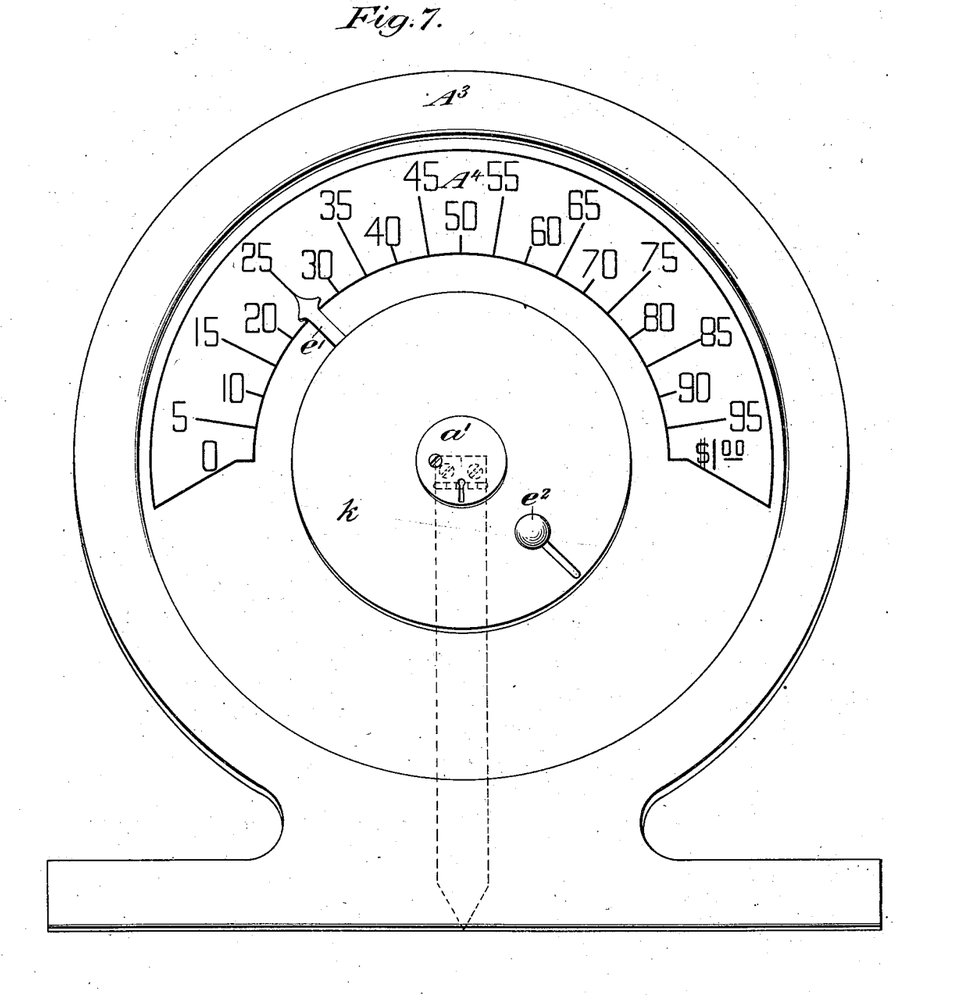
Fig. 7 is a face view of the second form of apparatus.
Figure 8:
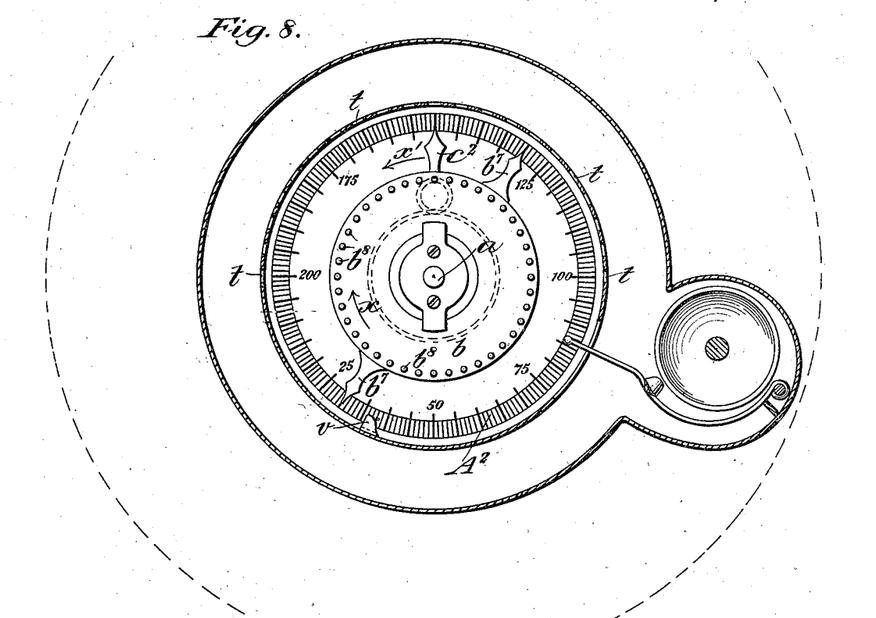
Fig. 8 is a face view with the front plate $k$ removed.

One form of the application of the above principle is shown in Figs. 3 and 6 where A is the back board or plate of a cash register case through which a hole is bored to receive the sleeves and shaft before referred to, and which contains a circular recess A' covered by glass $u$ at the back of which the pointers $c^2$ and $b^7$ move in front of a dial A², as shown in Fig. 6. The dial A² contains two series of numbers; running one to the right and the other to the left; the former being for the pointer $c^2$ and the latter for the pointer $b^7$.

Figure 4:
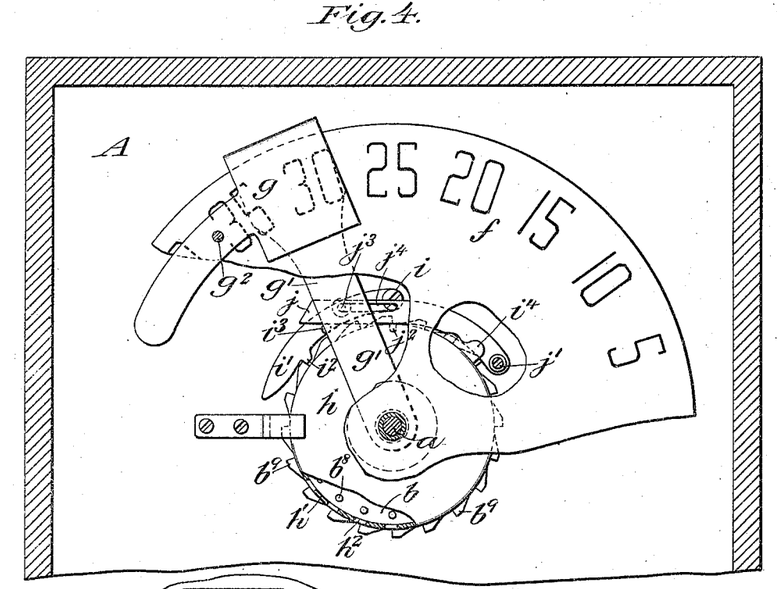
Figure 5:
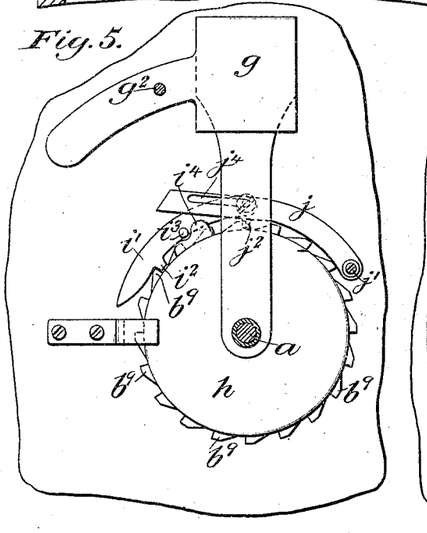

It is necessary that there should be certain mechanism whereby the adding and registering mechanism already described may be operated to register a desired amount and whereby the amount registered may be indicated. I will next describe such mechanism and the means by which it is operatively connected with the adding and registering mechanism having particular reference to Figs. 3, 4 and 5.

Figure 2:
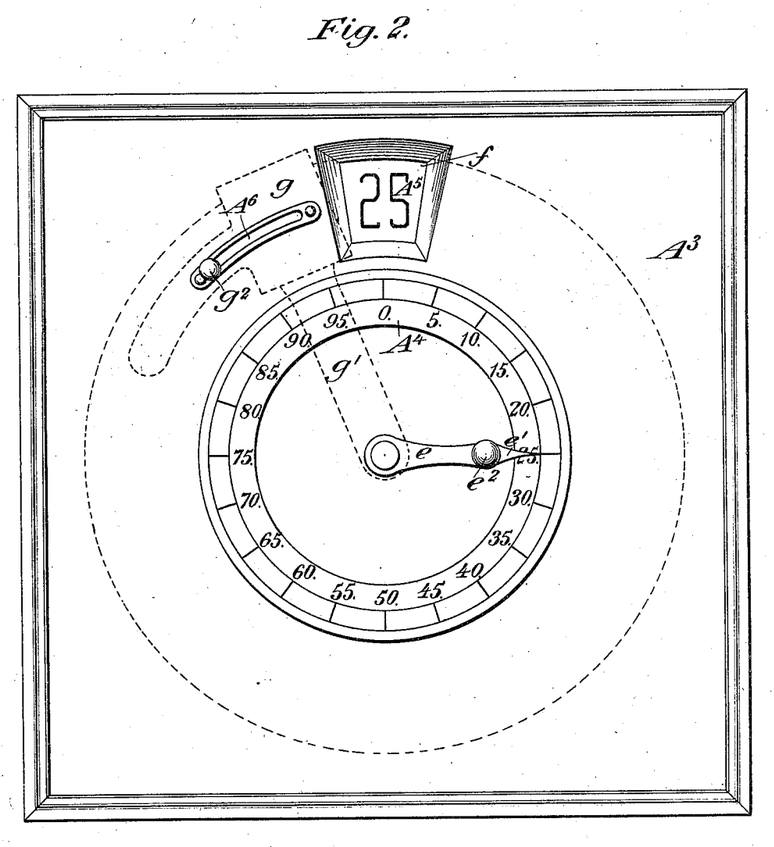
Fig. 2 is a face view of the apparatus.

The shaft $a$ projects forward of the disk $b$, as shown in Fig. 3, through the front-board or plate A³ of the cash register case. On the outer end of this shaft is fixed a handle $e$ carrying on its outer end a pointer $e'$. A dial A⁴ is placed upon the face of plate A³ so as to co-operate with the pointer $e'$, as shown in Fig. 2, being divided in multiples of five up to one hundred. Also fixed upon the shaft $a$, is a dial $f$ inside the casing which is shown in dotted lines in Fig. 2 excepting where it is exposed through the opening A⁵ in the front of the case. The numbers on the dial which revolves with the handle $e$, are so placed that corresponding numbers are opposite the opening A⁵ covered by the glass $u'$ and indicated by the pointer $e'$.

$g$ is a screen or shutter carried by an arm $g'$ which is free to reciprocate upon a bearing on the shaft $a$. To this shutter is attached a handle $g^2$ that projects out through a slot A⁶ in the front-board or plate of the frame.

$h$ is a disk containing a cylindrical rim $h'$ perforated by a series of holes $h^2$, at intervals, corresponding with the counts on the dial A⁴. The disk $h$ and flange $h'$ are fixed upon the shaft $a$ and therefore move in unison with the handle $e$ and pointer $e'$. The cylindrical flange $h'$ is also provided with a pawl $h^3$ that engages with a circular rack which may consist of a series of pins $b^8$ projecting inversely from the face of the disk $b$. The arrangement of this pawl is shown in detail in Fig. 3* from which it will be seen that the disk $h$ cannot move forward without carrying with it the disk $b$, but can move backward. The disk $b$ is provided on its periphery with a series of teeth $b^9$.

$i$ is a stud fixed to the casing A to which is pivoted a pawl $i'$ carrying a tooth $i^2$ in position to engage with the tooth $b^9$. This pawl $i'$ is given sufficient friction on its bearings to prevent its moving unless pushed. Its position is controlled by two members which press against the pin $i^3$ projecting from the pawl $i'$ in opposite directions. The piece $i^4$ is carried by the disk $h$ and when brought around so as to come in contact with the pin $i^3$, it thrusts the pawl $i'$ outward so as to disengage the tooth $i^2$ from a tooth $b^9$. A pawl $j$ pivoted to the casing at $j'$ when moved inward presses against the outside of the pin $i^3$ and pushes the pawl $i'$ inward so as to create engagement between the tooth $i^2$ and the tooth $b^9$. The pawl $j$ is provided with a finger $j^2$ in position to engage with the series of holes $h^2$ when the pawl $j$ is thrust forward. The pawl $j$ is moved in and out by a pin $j^3$ carried by the arm $g'$ and operating in a slot $j^4$ in the pawl $j$. Thus, when the shutter $g$ is in the position shown in Fig. 5 where it is interposed beneath the opening A⁵, it holds the pawl $j'$ so that its tooth $j^2$ is not in engagement with the flange $h'$; whereas, when the shutter is moved into the position shown in Fig. 4 so that the number beneath the opening A⁵ is revealed, the pawl $j$ is thrust inward so as to cause the tooth $j^2$ to enter one of the holes $h^2$ and lock the disk $h$ and so that, also, the pawl $j$ pushes the pin $i^3$ forward until the tooth $i^2$ engages with one of the teeth $b^9$ and locks the disk $b$. When, however, the shutter $g$ is moved back again so as to cover up the number beneath the opening $a^5$ and retract the tooth $j^2$ from the hole $h^2$, the pawl $i'$ will remain in engagement with the disk $b$ until it is pushed outward by the piece $i^4$ when the same is brought around by the backward movement of the disk $h$. This piece $i^4$ is so placed upon the disk $h$ that it comes in contact with the pin $i^3$ as the handle $e$ is moved backward just before the pointer $e'$ reaches the zero point in its backward movement.

In describing the operation of this form of cash register, I will assume that it is desired to register twenty-five cents. The operator moves the handle from zero to 25 as shown in Fig. 2. As he is doing so, the disk $b$ of the adding mechanism is carried forward as also the pointer $b^7$, but backward movement is prevented by the pawl $b^6$. The operator next pulls the handle $g^2$ so as to disclose the number 25. This movement forces the tooth $j^2$ into a hole $h^2$ and the tooth $i^2$ into engagement with a tooth $b^9$ and locks that disk and consequently the adding mechanism from forward movement. It also locks the disk $h$ with handle $e$ fixed to it from either forward or backward movement. The operator next moves the handle $g^2$ back to its normal position. This unlocks the indicator mechanism but leaves the disk $b$ locked. The operator next moves the handle $e$ back to zero and just as it reaches zero the disk $b$ is unlocked as to its forward movement by the piece $i^4$. The parts are now in condition for registering another amount which we will suppose to be seventy-five. The operator goes through the same motions as before, but when the indicator mechanism indicates 75, the disk $h$ will have made in all a complete revolution so that the pointer $b^7$ will have been moved all the way round to 100 and the pointer $c^2$ will have made one count, meaning one hundred. Thus the pointer $b^7$ will continue to register all sums between the hundreds and pointer $c^2$ will register the hundreds.

I will next describe the form of machine shown in Figs. 7 to 14 inclusive. Here the central shaft $a$ is fixed and the disk $b$, carrying planetary wheels $b^2$, $b^3$, and ratchet $b^5$ and pawl $b^6$ and pins $b^8$, is revoluble on the shaft. The wheel $d'$ is fixed to the case and the wheel $c'$ revolves and carries the pointer $c^2$ for which a dial $A^3$ is provided on the inside of the case. Pointers $b^7$, $b^7$, are oppositely arranged on the disk $b$. The latter pointers, therefore, indicate the fractions of one hundred and the pointer $c^2$, the hundreds on the same principle as the form of machine first described.

I will now describe the indicator mechanism and its connections with the adding and registering mechanism. A disk $k$ revolubly secured to the end of shaft $a$ carries the handle and indicator parts. This disk is secured to the end of the shaft by a lock $a'$ the tongue of which advances into a circular groove $a^2$ in the shaft. Thus, the disk can be readily unlocked and removed carrying with it the parts of the indicator mechanism and revealing the position of the pointers $b^7$ and $c^2$. The handle $e$ consists of a slide extending across the under side of disk $k$, governed by the hand piece $e^2$, which projects through a radial slot in the disk $k$, and carrying on the opposite end the pointer $e'$ which overlaps the front of the casing and indicates on the dial $A^4$. This pointer carries a finger $e^3$, which, when the pointer is shot outward into the position of Fig. 10, enters one of a series of openings $t$ in the case and locks the handle from circular movement in either direction.

Figure 9:
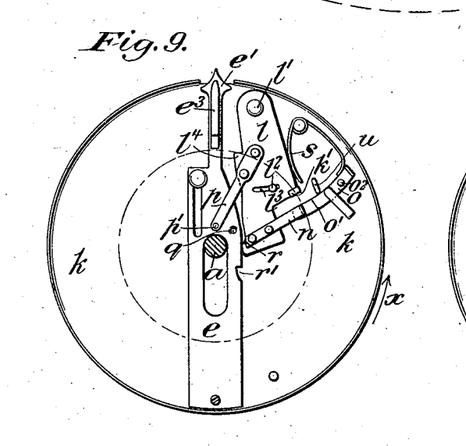
Figures 10, 14:
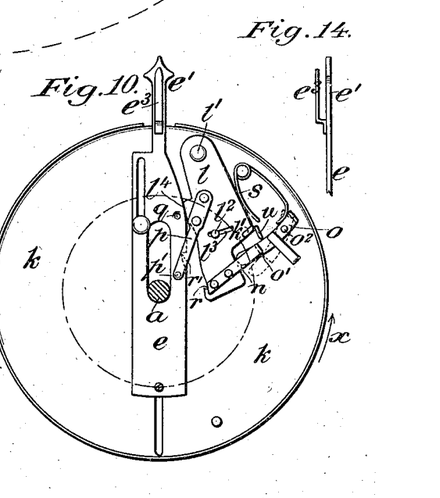
Figures 11, 12, 13:
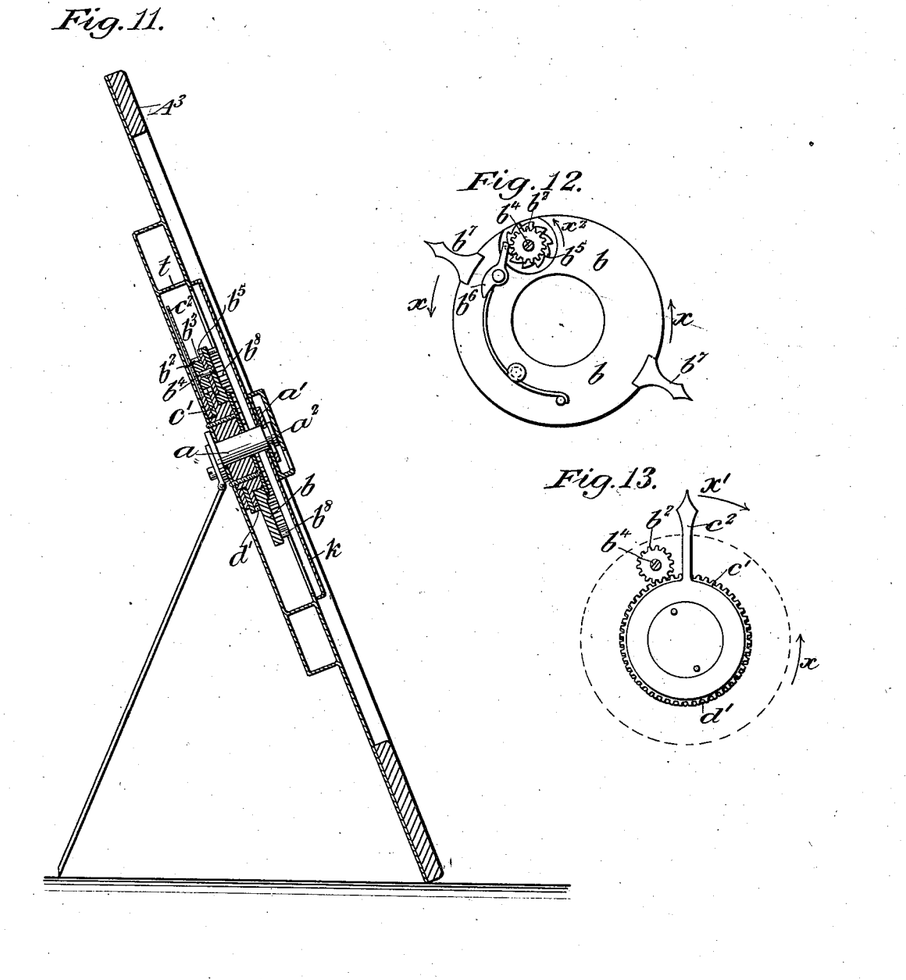

$l$ is a piece pivoted to plate $k$ at $l'$, and is further secured to the latter by the stud $l^2$. The central shaft $a$ on which the plate $k$ turns, passes through a slot in the handle $e$. The pivoted piece $l$ is held against the handle piece $e$ by the spring $s$ and is permitted to swing back and forth by the slot $l^3$. On the piece $l$ is a projection $k'$ which, when the parts are in their normal position shown in Fig. 9, is in line with the studs $b^8$ on the plate $b$, the position of which is indicated by the broken line in Figs. 9 and 10. This projection $k'$ rests between the studs and thus connects the face-plate $k$ with the plate $b$ so that when the plate $k$ is revolved, it carries the plate $b$ around with it, and thus actuates the adding and registering mechanism; backward movement being prevented by pawl $b^6$. As the piece $l$ is slid from the position of Fig. 3 to that of Fig. 4, its shoulder strikes against the shoulder $l^4$ on the pivoted piece $l$ and swings the latter one to the position shown in Fig. 10. The projection $k'$ is thus withdrawn out of line of the studs $b^8$ and the plate $k$ disconnected from the plate $b$. As the piece $l$ swings over, a spring latch $n$ on the latter catches in a notch $o'$ on the piece $o$ pivoted to the plate $k$ at $o^2$ and retains the piece $l$ in its second position with the projection $k'$ disconnected from the studs $b^8$. A stop $u$ limits the movement of the piece $l$. Secured to the piece $l$ is a spring piece $p$ having on its end a projection $p'$. When the piece $p$ is swung over into its second position shown in Fig. 10, the projection $p^*$ on the end of piece $p$ is brought below and in line with a hole $q$ in the handle-piece $e$. As the sliding piece $e$ is drawn back, the projection $p'$ springs into the hole $q$ and holds the piece $e$. The parts are now locked. The sliding piece $e$ cannot be moved out by reason of the connection of the projection $p'$ with the hole $q$, and the pivoted piece $l$ cannot swing back to its former position on account of the engagement of the latch $n$ with the catch $o'$. As the projection $k'$ is thrown out of line of the studs $b^8$, the plate $k$ can move around freely in either direction on the pin $a$. To release the parts, and at the same time bring the plate $k$ into engagement with the plate $b$ the handle is returned to the zero point and as this is being done, a projection $v$ on the frame will strike against the piece so that the piece $o$ is swung around on the pivot $o^2$, as shown in dotted lines in Fig. 4, and the catch $o'$ slid out of engagement with the latch $n$. The spring $s$ then pushes the pivoted piece $l$ back against the handle-piece $e$, thus bringing the projection $k'$ in line with the studs $b^8$. At the same time, the projection $p'$ on the spring-piece $p$, which is beveled on one side for the purpose, is caused to slide out of the hole $q$ and the parts are once more in the position shown in Fig. 9. The pieces $e$ and $l$ are notched, as shown at $r$, $r'$ so that after the operator has started sliding the pointer $e'$ outward he cannot withdraw it until he has slid it all the way out. Should he attempt to withdraw it sooner, the projection $r$ in the position shown in Fig. 9 will catch and hold in the notch $r'$ and this will be true until the projection $r$ has been moved into the position shown in Fig. 10, as the consequence of sliding the pointer all the way out.

It will now be seen that the two forms of mechanism described though differing widely in form, possess many points in common in mode of operation. In the last, a single dial only is used for the indicator, but when the required number is reached and disclosed or indicated, by shoving the pointer $e'$ outward or moving the shutter in the first form, both the indicator and adding mechanism are locked. As soon as the disclosure or indication of the number ceases, the indicator mechanism is unlocked and is free to return to zero.

Among the chief points of utility of my cash register is its cheapness, since it can be built at a very small fraction of the cost of any practicable cash register known to me.

I do not intend to be limited to the form or number of parts described because I am well aware that indefinite variations may be made without departing from the principle of my invention.

I claim—

1. In a cash register, in combination, a scale, a discloser or indicator, a slide whereby the scale and the discloser or indicator are moved relatively, a handle whereby the discloser or indicator and the number on the scale which it is desired to register are brought adjacent to each other, registering mechanism, means whereby the forward movements of said handle are transmitted to said registering mechanism and means connected with said discloser or indicator whereby said transmitting mechanism is rendered inoperative, substantially as described.

2. In a cash register, in combination, a scale, a discloser or indicator, a slide whereby the scale and the discloser or indicator are moved relatively, a handle whereby the discloser or indicator and the number on the scale which it is desired to register are brought adjacent to each other, registering mechanism, means whereby the forward movement of said handle is transmitted to said registering mechanism, means connected with said discloser or indicator whereby said transmitting mechanism is rendered inoperative and means whereby said transmitting mechanism is rendered operative again, substantially as described.

3. In a cash register, in combination, a scale, a discloser or indicator, a slide whereby the scale and the discloser or indicator are moved relatively, a handle whereby the discloser or indicator and the number on the scale which it is desired to register are brought adjacent to each other, registering mechanism, means whereby the motion of said handle is transmitted to said registering mechanism, means connected with said discloser or indicator whereby the forward movement of said handle is locked while the number is disclosed or indicated and unlocked when the number is not disclosed or indicated, means also connected with said discloser or indicator whereby the forward movement of said registering mechanism is stayed and a member whereby this stay is removed upon the return of the handle to the zero point, substantially as described.

4. In a cash register, in combination a dial, a discloser or indicator, a handle whereby the discloser or indicator and the number on the dial which it is desired to register are brought adjacent to each other a slide actuating the discloser or indicator, registering mechanism and means whereby said handle is locked while the number is disclosed or indicated, substantially as described.

5. In a cash register, in combination a dial, a discloser or indicator, a handle whereby the discloser or indicator and the number on the dial which it is desired to register are brought adjacent to each other a slide actuating the discloser or indicator, registering mechanism and means whereby said handle and said registering mechanism are locked while the number is disclosed or indicated, substantially as described.

6. In a cash register, in combination a dial, a discloser or indicator, a handle whereby the discloser or indicator and the number on the dial which it is desired to register are brought adjacent to each other a slide actuating the discloser or indicator, registering mechanism and means whereby said registering mechanism is rendered inoperative by the movement of said slide and means whereby said registering mechanism is rendered operative by the return of said handle to the zero point, substantially as described.

7. In a cash register, in combination, a dial, a reciprocating handle, an indicator moved by the handle, registering mechanism, mechanism interposed between the handle and the registering mechanism whereby the forward movement of the former only actuates the latter, a locking device to prevent the backward movement of the handle until the amount is indicated and a locking device to prevent the forward movement of the handle after the amount is indicated until after the handle has been returned to the zero point, substantially as described.

8. In a cash register, in combination, a scale, a discloser or indicator, a handle whereby the discloser or indicator and the number on the scale which it is desired to register are brought adjacent to each other, registering mechanism, means whereby said registering mechanism is rendered inoperative by the forward movement of said discloser or indicator and means whereby said parts (with the exception of the registering mechanism) are returned to their starting position by the return movements of said discloser or indicator and said handle, substantially as described.

9. In a cash register in combination, a reciprocating discloser or indicator and a scale movable relatively and adjacent to each other, a handle for producing such relative movement, a detent movable with said discloser or indicator, a member connected with said scale and adapted to be engaged by said detent at the different positions of the discloser or indicator relatively to the scale, registering mechanism, means whereby the latter receives a forward movement for each forward movement between the scale and the discloser or indicator, all substantially as described, whereby the movement of the discloser or indicator in one direction causes the detent to lock the parts and the movement in the opposite direction unlocks the parts and permits the backward movement of the handle to return the parts (excepting the registering mechanism) to their starting positions, as set forth.

10. In a cash register in combination, a scale, a discloser or indicator, a handle whereby the discloser or indicator and the number on the scale which it is desired to register are brought adjacent to each other, registering mechanism, means whereby the latter is rendered inoperative by the forward movement of said discloser or indicator, a detent whereby the discloser or indicator is locked upon its return movement and means whereby said detent is released upon the return of the handle to the zero point, substantially as described.

11. In a cash register, in combination, a revoluble face plate, a lock by which it is secured in position, and the following parts behind said face plate: a dial, a rotatory member, means whereby said member is moved by the forward movement only of said face plate, a fixed wheel, a concentric revoluble wheel, a wheel gearing with said fixed and revoluble wheels and carried by said member in an orbit around the same; the relationship between the teeth of the revoluble wheel and orbital wheel being different from the relationship between the teeth of the fixed wheel and orbital wheel, substantially as described.

12. In a cash register, in combination, a dial, a revoluble and radially movable handle, an indicator moved by the handle, a revoluble member, concentric projections from said handle and said member arranged to be engaged and disengaged by the radial movements of said handle, means whereby said member is locked against backward movement and means whereby the forward movement of said member is registered, substantially as described.

GEO. W. BAILEY.

Witnesses:
J. E. GREER,
FRED. S. KEMPER.